(12) United States Patent
Ohta

(10) Patent No.: US 6,183,094 B1
(45) Date of Patent: *Feb. 6, 2001

(54) ILLUMINATING APPARATUS AND PROJECTING APPARATUS

(75) Inventor: Takashi Ohta, Sakai (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/133,935

(22) Filed: Aug. 14, 1998

(30) Foreign Application Priority Data

Aug. 22, 1997 (JP) .................................................. 9-226365

(51) Int. Cl.$^7$ .................................................. G03B 21/25
(52) U.S. Cl. .................................................. 353/38; 353/34
(58) Field of Search .................................................. 353/31, 33, 34, 353/37, 38, 101, 102; 362/269, 270, 277, 280, 281, 319, 323

(56) References Cited

U.S. PATENT DOCUMENTS

| | | | |
|---|---|---|---|
| 4,443,076 | * | 4/1984 | Itabashi .............................. 353/101 |
| 4,943,154 | | 7/1990 | Miyatake et al. ................... 353/31 |
| 4,988,188 | * | 1/1991 | Ohta .................................... 353/101 |
| 5,046,838 | * | 9/1991 | Iwasaki ............................... 353/101 |
| 5,098,183 | | 3/1992 | Sonehara ............................. 353/31 |
| 5,179,398 | * | 1/1993 | Iizuka ................................. 353/101 |
| 5,355,188 | * | 10/1994 | Biles et al. .......................... 353/69 |
| 5,664,859 | * | 9/1997 | Salerno et al. ..................... 353/119 |
| 5,860,721 | * | 1/1999 | Bowron et al. ...................... 353/38 |
| 5,865,521 | * | 2/1999 | Hashizume et al. ................. 353/38 |

FOREIGN PATENT DOCUMENTS 2-163729  6/1990  (JP) .
4-223456  8/1992  (JP) .

* cited by examiner

Primary Examiner—William Dowling
(74) Attorney, Agent, or Firm—Sidley & Austin

(57) ABSTRACT

A projecting apparatus has a light source emitting a light, an optical integrator including a first lens array and a second lens array, a dividing optical system dividing the light emitting from the light source into three wavelength ranges, three panels capable of having images formed thereon such that the images formed correspond to the divided lights, a composition optical system composing three image lights from the images to be projected formed on the panels, an optical element provided between the light source and the panel and transmitting a light ray emitted from the light source; and a projection optical system projecting the composed image light. The optical element is movably supported in order to adjust a position of an illumination light on the illumination object.

15 Claims, 5 Drawing Sheets though the UV-IR cut filter 16, the light strikes the first lens array 20. The light emerging from the first lens array 20 is reflected by the reflecting mirror 18 and then strikes the second lens array 22.

ILLUMINATING APPARATUS AND PROJECTING APPARATUS

This application is based on the application No. 9-226365 filed in Japan, the content of which is hereby incorporated by reference.

BACKGROUND OF THE INVENTION

1. Field of the Invention

The present invention pertains to an illuminating apparatus and to a light projecting apparatus suitable for an image projecting device such as a liquid crystal projector.

2. Description of the Related Art

Conventionally, in a liquid crystal projector that projects images formed on liquid crystal panels, it is desirable for the illuminating apparatus that illuminates the liquid crystal panels to concentrate the light from the light source onto the liquid crystal panels to the extent possible, so that the light from the light source may be used as efficiently as possible.

However, in order to deal with variation in the accuracy of the component parts, it is necessary for an illuminating apparatus to illuminate an area slightly larger than the liquid crystal panel. This extra use of light reduces the efficiency in the use of the light from the light source.

In addition, to make it lightweight and for ease in mass production, a formed resin product is generally used for the housing that contains the illuminating optical system. As a result, in order to alter the positions of the liquid crystal panels and mirrors mounted in the housing, the mold must be changed, which is costly and time-consuming.

SUMMARY OF THE INVENTION

The object of the present invention is to provide an improved illuminating apparatus and light projecting optical apparatus.

Another object of the present invention is to provide an illuminating apparatus and light projecting optical apparatus that can concentrate the light from the light source on the illumination object to the extent possible.

These objects are attained by means of an illuminating apparatus having a construction comprising a light source emitting a light, an optical integrator including a first lens array and a second lens array, a dividing optical system dividing the light emitting from the light source into three wavelength ranges, three panels having formed images thereon such that the formed images correspond to the divided lights, a composition optical system composing three image lights from the formed images on the panels, an optical element provided between the light source and the panel and transmitting a light ray emitted from the light source, and a projection optical system projecting the composed image light, wherein the optical element is movably supported in order to adjust a position of an illumination light on the illumination object.

The invention itself, together with further objects and attendant advantages, will be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENT

The liquid crystal projector pertaining to one embodiment of the present invention is explained in detail below with reference to FIGS. 1 through 9.

Figure 1:
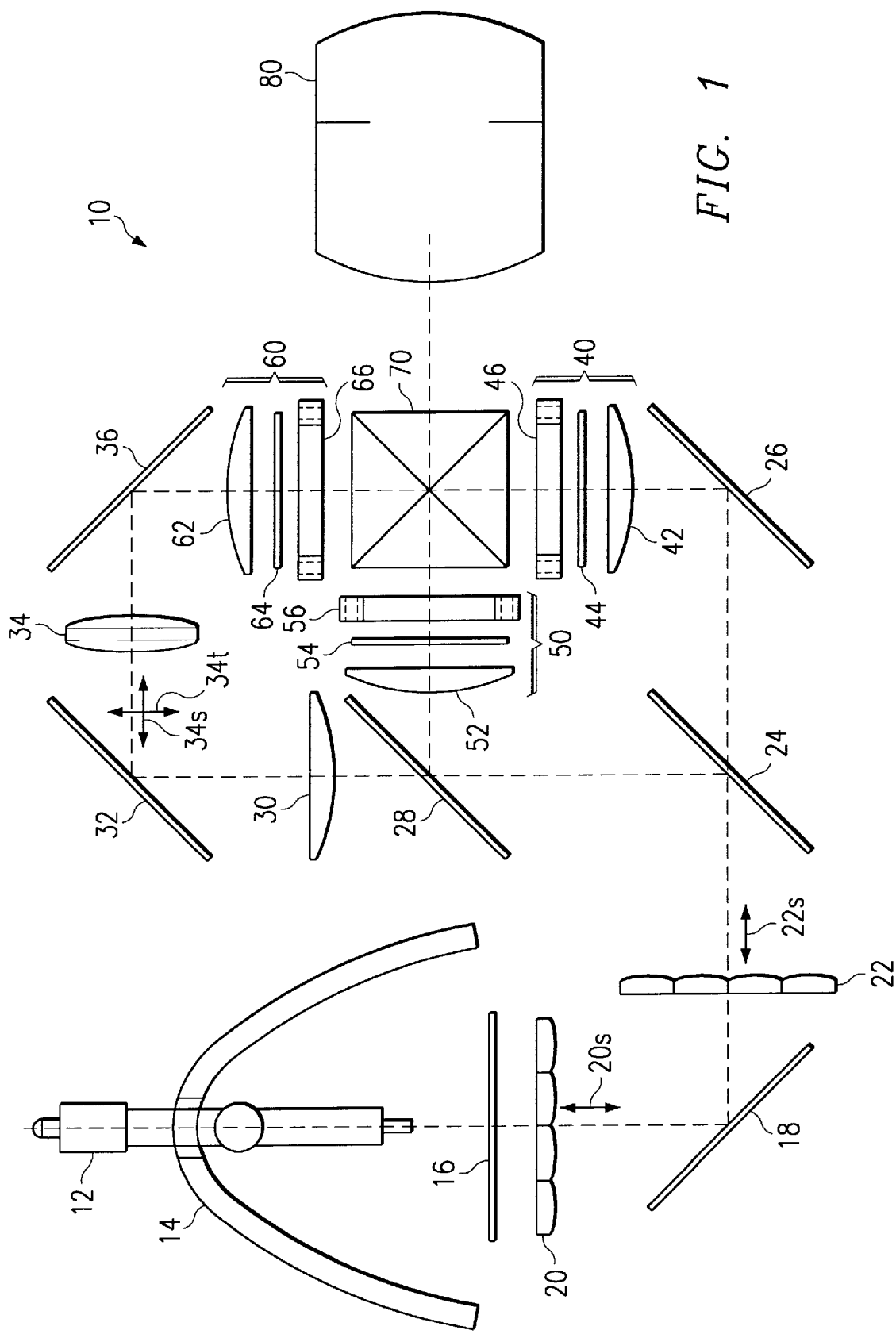
FIG. 1 is a diagram showing the liquid crystal projector of one embodiment of the present invention.

Liquid crystal projector 10 combines images of red, green and blue light formed on liquid crystal panels 46, 56 and 66 via cross-dichroic prism 70, and projects an enlarged image by means of a light projecting lens 80, as shown in the construction drawing comprising FIG. 1. The liquid crystal projector 10 has a metal halide lamp 12 located along the optical axis, a reflector 14, a UV-IR cut filter 16, a first lens array 20, a second lens array 22, reflecting mirrors 18, 26, 32 and 36, dichroic mirrors 24 and 28, a field lens 30, a relay lens 34, RGB component units 40, 50 and 60, a cross-dichroic prism 70, and a light projecting lens 80.

The light emitted from the metal halide lamp 12 comprising an essentially single-point light source is reflected by means of the reflector 14 and becomes a bundle of almost parallel rays of light. After being stripped of harmful ultraviolet and near-infrared light by the UV-IR cut filter 16, the light strikes the first lens array 20. The light emerging from the first lens array 20 is reflected by the reflecting mirror 18 and then strikes the second lens array 22.

The first lens array 20 comprises rectangular lens cells aligned side by side along a plane, and each lens cell has a focal point near the second lens array 22. The second lens array 22 comprises the same number of lens cells as the first lens array 20, and are also aligned side by side along a plane, so that they form an image of each corresponding lens cell of the first lens array 20 on the liquid crystal panels 46, 56 and 66 together with their own images.

The light emerging from the second lens array 22 is divided into red, green and blue components, which illuminate liquid crystal panels 46, 56 and 66, respectively. In other words, the light rays emerging from the second lens array 22 are split into (i) red light that reaches the red liquid crystal unit 40 after passing through the red pass-through dichroic mirror 24, (ii) blue light that passes through the blue liquid crystal unit 60 after reflecting off of the red pass-through dichroic mirror 24 and then passing through the green-reflecting dichroic mirror 28, and (iii) green light that passes through the green liquid crystal unit 50 after reflecting off of the red pass-through dichroic mirror 24 and then reflecting off of the green-reflecting dichroic mirror 28. The liquid crystal units 40, 50 and 60 comprise field lenses 42, 52 and 62, polarizing plates 44, 54 and 64, and liquid crystal panels 46, 56 and 66, respectively.

The field lenses 42 and 52 of the red and green liquid crystal units 40 and 50 form an image near the pupil of the light projecting lens 80 from the secondary light source image near the second lens array 22. The blue light that passes through the green-reflecting dichroic mirror 28 after reflecting off of the red pass-through dichroic mirror 24 strikes the field lens 30, is formed into a focal point near the relay lens 34, passes through the field lens 62 of the blue liquid crystal unit 60, and then illuminates the area around the blue liquid crystal panel 66. The field lens 62 forms an image near the pupil of the light projecting lens 80 from the light source image near the relay lens 34. The relay lens 34 forms an image on the blue liquid crystal panel 66 from the rectangular light rays near the field lens 30 (the image of the first lens array 20).

The different light color components that were modulated by the red, green and blue liquid crystal panels 46, 56 and 66 are combined by the cross-dichroic prism 70 and then projected onto a screen by the light projecting lens 80.

Next, the adjustment in the illumination of the liquid crystal panels will be explained with reference to FIGS. 2 through 9. FIGS. 2 through 9 are drawings showing the results of analysis of the light illuminating the liquid crystal panels 46, 56 and 66 of the liquid crystal projector 10. The areas inside the rectangular regions indicated by the solid lines are the pass-through areas of liquid crystal panels 46, 56 and 66. The dots indicate the landing points of the multiple light rays emitted from the lamp 12 that were followed in the analysis, and comprise illumination points on the surfaces of liquid crystal panels 46, 56 and 66.

The red and green liquid crystal panels 46 and 56 will first be explained. Adjustments with regard to the red and green liquid crystal panels 46 and 56 can be made by moving the first and second lens arrays 20 and 22 along the optical axis.

Figure 2:
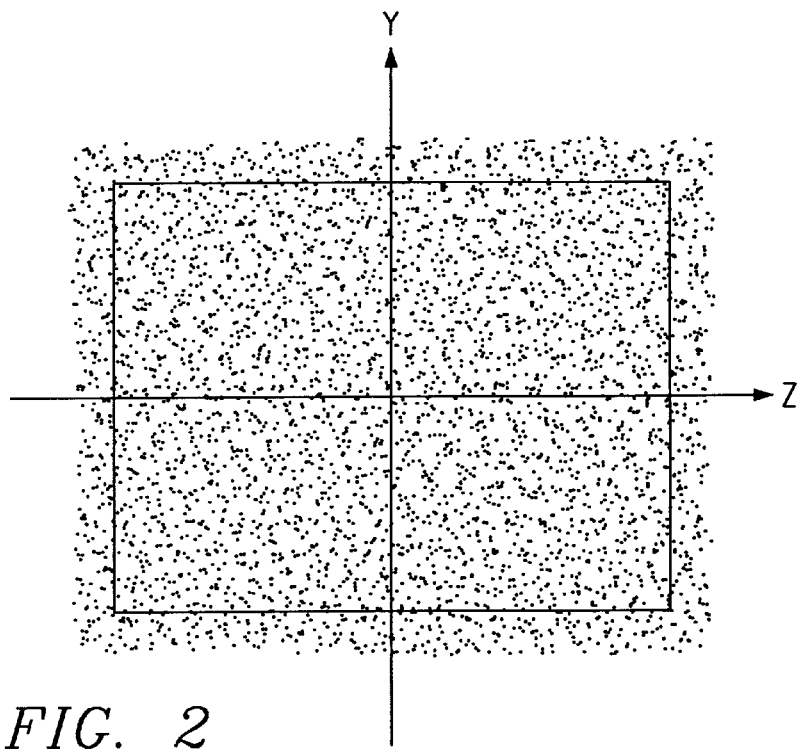
FIG. 2 is a graph of the illumination area regarding the red and green liquid crystal panels in the initial design.
Figure 3:
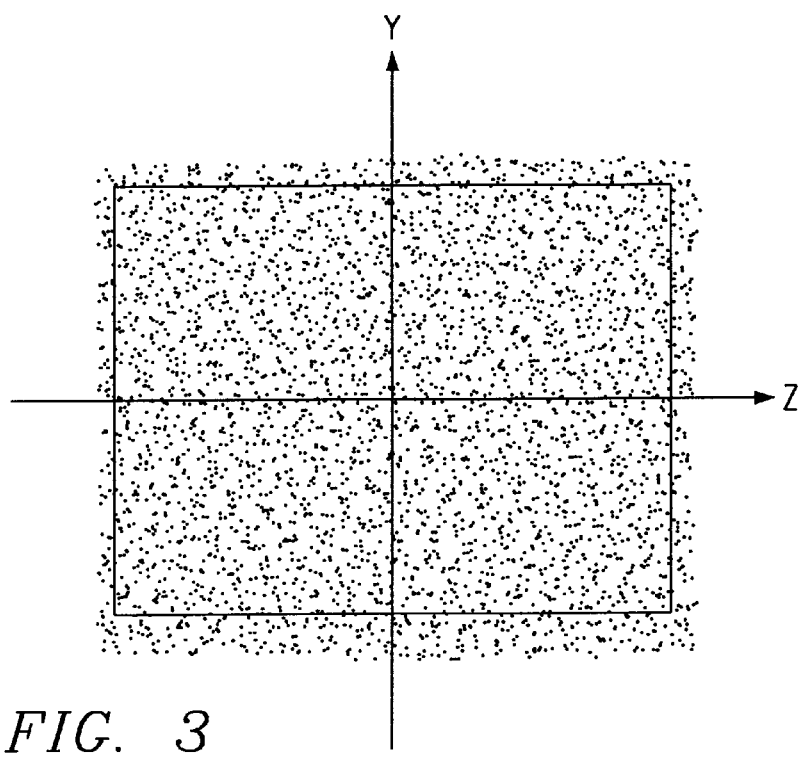
FIG. 3 is a graph of the illumination area regarding the red and green liquid crystal panels where the second lens array has been moved 4 mm toward the liquid crystal panels.
Figure 4:
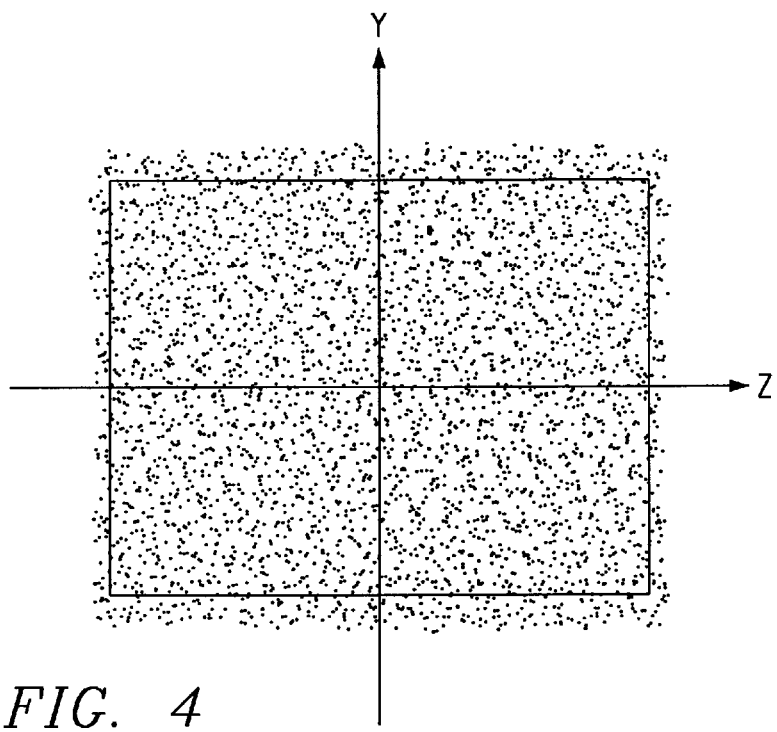
FIG. 4 is a graph of the illumination area regarding the red and green liquid crystal panels where the first lens array has been moved 4 mm toward the light source.

Specifically, in the initial design, the red and green liquid crystal panels 46 and 56 of the liquid crystal projector 10 are illuminated as shown in FIG. 2, and the pass-through area percentage of the liquid crystal panels 46 or 56 relative to the illumination area is 79.57%. If the second lens array 22 is moved 4 mm along the optical axis toward the liquid crystal panels 46 and 56 relative to the initial design, the pass-through area percentage of the liquid crystal panels 46 or 56 relative to the illumination area becomes 91.37%, as shown in FIG. 3, an increase of 11.8 percentage points. The number of light rays passing through the liquid crystal panels 46 or 56 also increases by 14.5%. On the other hand, if the first lens array 20 is moved 4 mm toward the light source along the optical axis relative to the initial design, the pass-through area percentage of the liquid crystal panels 46 or 56 relative to the illumination area becomes 89.81%, as shown in FIG. 4, an increase of 10.24 percentage points. The number of light rays passing through the liquid crystal panels 46 or 56 here increases by 12.9%.

The blue liquid crystal panel 66 will now be explained. Adjustments with regard to the blue liquid crystal panel 66 can be made by moving the relay lens 34 in the directions along and perpendicular to the optical axis.

Figure 5:
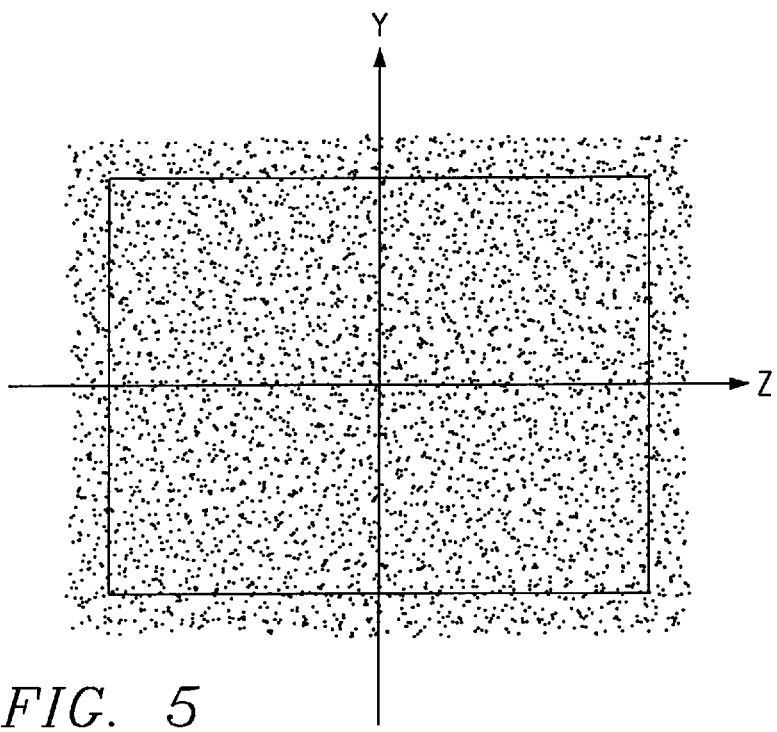
FIG. 5 is a graph of the illumination area regarding the blue liquid crystal panel in the initial design.
Figure 6:
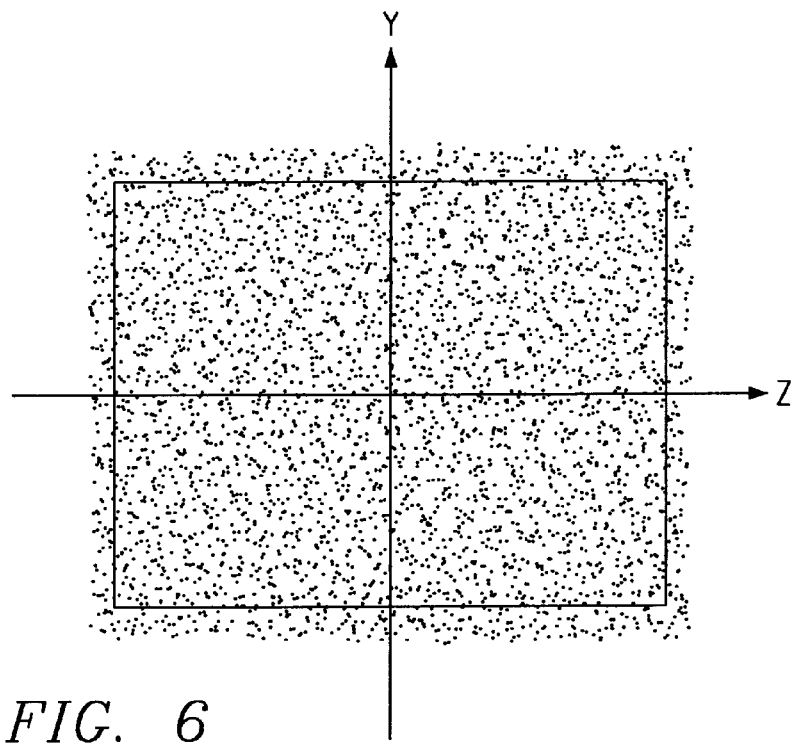
FIG. 6 is a graph of the illumination area regarding the blue liquid crystal panel where the relay lens has been moved 1 mm toward the light source.
Figure 7:
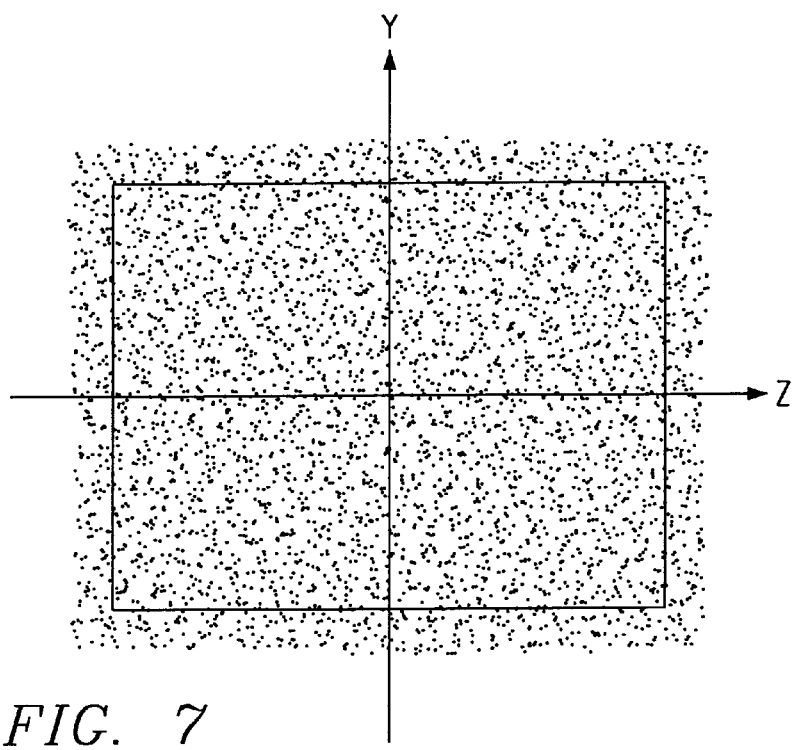
FIG. 7 is a graph of the illumination area regarding the blue liquid crystal panel where the relay lens has been moved 1 mm toward the liquid crystal panels.
Figure 8:
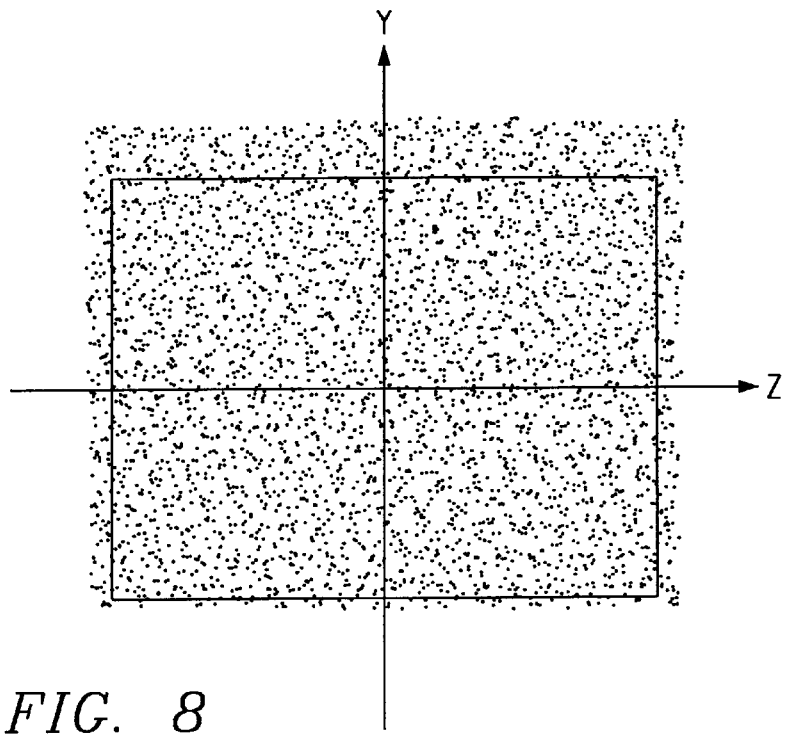
FIG. 8 is a graph of the illumination area regarding the blue liquid crystal panel where the relay lens has been moved 0.8 mm vertically.
Figure 9:
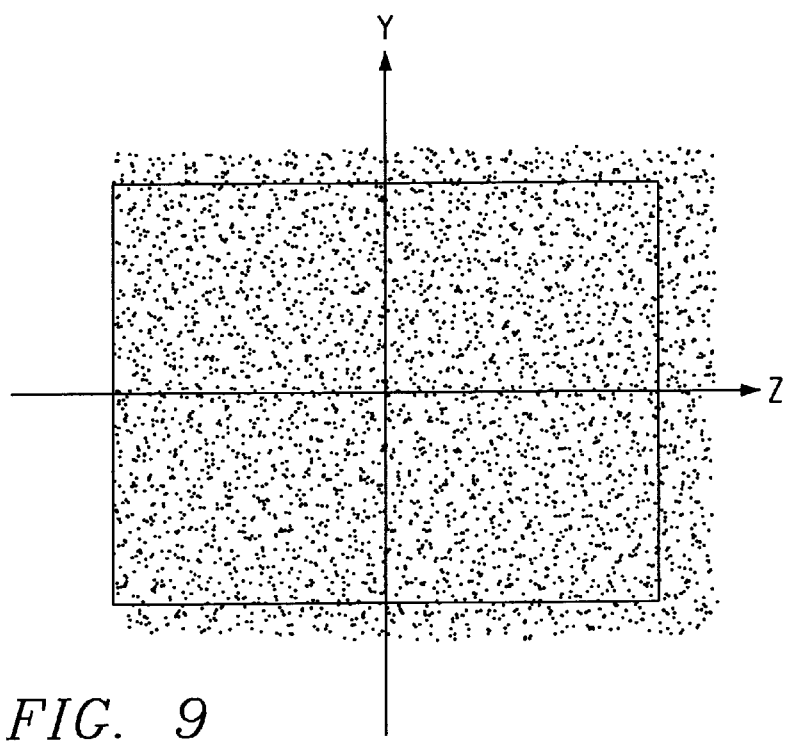
FIG. 9 is a graph of the illumination area regarding the blue liquid crystal panel where the relay lens has been moved 0.8 mm horizontally.

Specifically, in the initial design, the blue liquid crystal panel 66 is illuminated as shown in FIG. 5. In other words, the pass-through area percentage of the liquid crystal panel 66 relative to the illumination area is 78.98%. If the relay lens 34 is moved 1 mm along the optical axis toward the light source 12 relative to the initial design, the pass-through area percentage of the liquid crystal panel 66 relative to the illumination area becomes 84.31%, as shown in FIG. 6, an increase of 4.33 percentage points. Conversely, if the relay lens 34 is moved 1 mm along the optical axis toward the liquid crystal panel 66, the pass-through area percentage of the liquid crystal panel 66 relative to the illumination area becomes 73.99%, as shown in FIG. 7, a decrease of 4.99 percentage points. If the relay lens 34 is moved 0.8 mm in a vertical direction that is perpendicular to the optical axis, the illumination area moves upward relative to the liquid crystal panel 66, as shown in FIG. 8. When this occurs, the pass-through area percentage of the liquid crystal panel 66 relative to the illumination area is 78.36%, essentially identical to the percentage in the initial design (a decrease of 0.62 percentage points). If the relay lens 34 is moved 0.8 mm in a horizontal direction that is perpendicular to the optical axis, the illumination area moves to the right of the pass-through area of the liquid crystal panel 66, as shown in FIG. 9. When this occurs, the pass-through area percentage of the liquid crystal panel 66 relative to the illumination area is 77.9%, essentially identical to the percentage in the initial design (a decrease of 1.08 percentage points).

As explained above, when the illumination areas of the liquid crystal panels 46, 56 and 66 are adjusted by moving the first and second lens arrays 20 and 22 and the relay lens 34 of the relay optical system of the liquid crystal projector 10, said adjustment can be performed without having to change the forming mold for the housing. Therefore, the light from the light source can be concentrated on the liquid crystal panels 46, 56 and 66 as far as possible with easy adjustment.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

I claim:

1. An illuminating apparatus comprising:

a light source;

an illumination object;

an optical element provided between the light source and the illumination object, wherein the optical element transmits a light ray emitted from the light source; and an optical integrator having a first lens array and a second lens array, wherein at least one of the first lens array and the second lens array is movable and adapted for selective movement along a direction of an optical axis thereof, wherein the optical element is movably supported in order to enable adjustment of a position of an illumination light on the illumination object.

2. An illuminating apparatus in accordance with claim 1, wherein the optical element is movably supported along a direction of an optical axis thereof.

3. An illuminating apparatus in accordance with claim 1, wherein the optical element is movably supported along a direction perpendicular to an optical axis thereof.

4. A projecting apparatus comprising:

a light source;

a panel capable of having an image formed thereon;

an optical element provided between the light source and the panel, wherein the optical element transmits a light ray emitted from the light source;

an optical integrator having a first lens array and a second lens array;

a projection optical system for projecting the image to be formed on the panel, wherein the optical element is movably supported in order to adjust a position of an illumination light on the panel, and wherein at least one of the first lens array and the second lens array is movably supported alone a direction of an optical axis thereof.

5. A projecting apparatus in accordance with claim 4, wherein the optical element is movably supported along a direction of an optical axis thereof.

6. A projecting apparatus in accordance with claim 4, wherein the optical element is movably supported along a direction perpendicular to an optical axis thereof.

7. A projecting apparatus comprising:

a light source to emit a light;

an optical integrator having a first lens array and a second lens array;

a dividing optical system to divide light emitted from the light source into three wavelength ranges;

three panels capable of having images formed thereon, wherein each image corresponds to a wavelength range of light divided by the dividing optical system;

a composition optical system to compose three image lights from images formed on the panels;

an optical element provided between the light source and the panels to transmit a light ray emitted from the light source; and a projection optical system to project a composed image light, wherein at least one of the first lens array and the second lens array is movably supported along a direction of an optical axis thereof, and wherein the optical element is movably supported in order to adjust a position of an illumination light on the panels.

8. A projecting apparatus in accordance with claim 7, wherein the composition optical system is a cross dichroic prism.

9. A projecting apparatus in accordance with claim 7, wherein the optical element is located between the dividing optical system and the panels, and is movably supported along a direction of an optical axis thereof.

10. A projecting apparatus in accordance with claim 7, wherein the optical element is located between the dividing optical system and the panels, and is movably supported along a direction perpendicular to an optical axis thereof.

11. A projecting apparatus in accordance with claim 7, wherein the dividing optical system comprises at least two dichroic mirrors.

12. A projecting apparatus in accordance with claim 7, wherein the panels are liquid crystal displays.

13. An illuminating apparatus comprising:

a light source to emit an illumination light, an illumination object for being illuminated by illumination light emitted by the light source; and an optical integrator, disposed between the light source and the illumination object, including a fist lens array having a plurality of lens cells and a second lens array, the first lens array and the second lens array being arranged so that each lens cell of the first lens array has a focal point near the second lens array, wherein at least one of the first lens array and the second lens array is movable and adapted for selective movement along a direction of an optical axis thereof.

14. A projecting apparatus comprising:

a light source to emit an illumination light;

a panel, which is illuminated by illumination light emitted by the light source, for forming an image thereon;

an optical integrator, disposed between the light source and the panel, including a first lens array having a plurality of lens cells and a second lens array, the first lens array and the second lens array being arranged so that each lens cell of the first lens array has a focal point near the second lens array; and a projection optical system for protecting an image formed on the panel, wherein at least one of the first lens array and the second lens array is movable and adapted for selective movement along a direction of an optical axis thereof.

15. A projecting apparatus comprising:

a light source to emit an illumination light;

a panel for receiving illumination light emitted by the light source and for forming an image thereon;

an optical integrator, disposed between the light source and the panel, including a first lens array having a plurality of lens cells and a second lens array;

a relay lens system, disposed between the optical integrator and the panel, having an optical element; and a projection optical system for projecting an image formed on the panel, wherein the optical element is movably supported along a direction of an optical axis thereof as well as in a direction perpendicular to such optical axis in order to enable adjustment of a position of illumination light emitted by the light source on the panel.

* * * * *

UNITED STATES PATENT AND TRADEMARK OFFICE
CERTIFICATE OF CORRECTION

PATENT NO. : 6,183,094 B1
DATED : February 6, 2001
INVENTOR(S) : Takashi Ohta

It is certified that error appears in the above-identified patent and that said Letters Patent is hereby corrected as shown below:

<u>Column 5,</u>
Line 9, (claim 4, line 15), delete "alone", and insert -- along --.

<u>Column 6,</u>
Line 11, (claim 13, line 6), delete "fist", and insert -- first --.

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*